Figure 1:
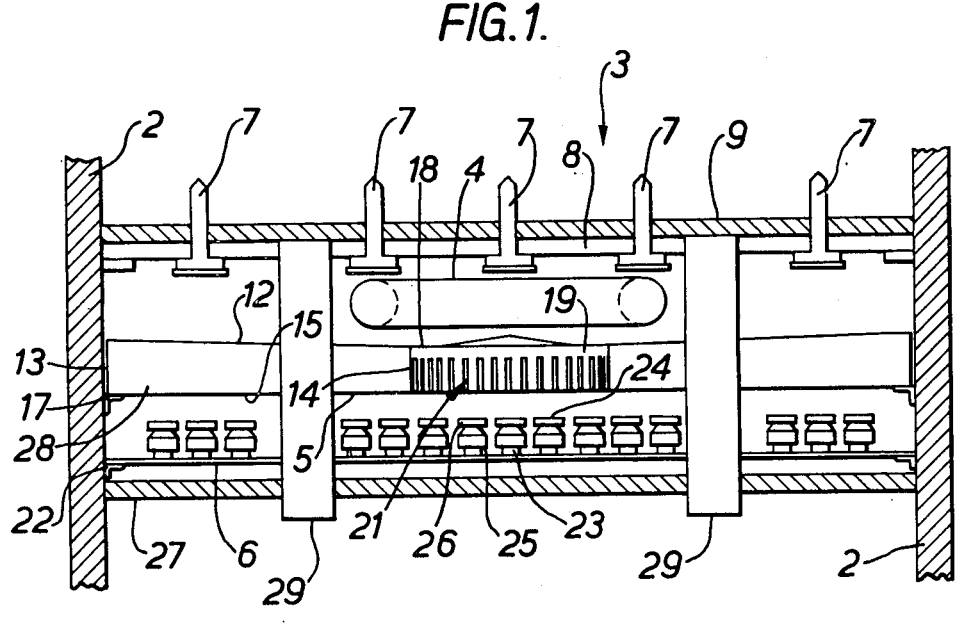

United States Patent
Alcock

[11] 3,880,961
[45] Apr. 29, 1975

[54] MULTI-BED REACTORS

[75] Inventor: Leslie Alcock, Bexleyheath, England

[73] Assignee: The British Petroleum Company Limited, London, England

[22] Filed: Dec. 27, 1973

[21] Appl. No.: 428,885

[30] Foreign Application Priority Data
Jan. 23, 1973 United Kingdom................. 3335/73

[52] U.S. Cl. ..................... 261/16; 261/96; 261/97; 23/288 R; 23/288 K; 208/48 Q
[51] Int. Cl. .............................................. B01f 3/04
[58] Field of Search......... 208/48 Q, 213; 23/288 R, 23/288 K; 261/96, 97, 16

[56] References Cited
UNITED STATES PATENTS

| | | | |
|---|---|---|---|
| 3,353,924 | 11/1967 | Riopelle............................ | 23/288 R |
| 3,378,349 | 4/1968 | Shirk.................................... | 261/97 |
| 3,598,541 | 8/1971 | Henncmuth et al. ............. | 23/288 R |
| 3,598,542 | 8/1971 | Carson et al...................... | 23/288 R |
| 3,723,072 | 3/1973 | Carson et al...................... | 23/288 R |

*Primary Examiner*—Tim R. Miles
*Assistant Examiner*—Gregory N. Clements
*Attorney, Agent, or Firm*—Morgan, Finnegan, Durham & Pine

[57] ABSTRACT

A quench box suitable for use in a down flow reactor has walls defining an inner and an outer compartment, passages in the outer-compartment wall, a contoured roof giving a valley with passages into the inner compartment, and passages in the floor of the outer compartment.

Preferred ratios of the areas of the three sets of passages are given and preferred ratios of dimensions for the box. The box is particularly suitable for reactors for the hydrocatalytic treatment of petroleum fractions boiling above 300°C and a hydrogen injection ring may be placed above the quench box.

7 Claims, 4 Drawing Figures

MULTI-BED REACTORS

This invention relates to multi-bed downflow hydrocatalytic reactors and particularly to a quench box for such reactors.

In one form of down-flow reactor for hydrocatalytic processes the catalyst is disposed in a series of separated beds. Some of the hydrogen is added with the feed but additional hydrogen may be injected between the beds. Such a system is particularly useful for exothermic reactions, since the additional hydrogen can act as a coolant to control the inlet temperature to the next bed and thereby help to control the temperature increase along the reactor. Rapid and efficient mixing of the added hydrogen with the reactants is obviously desirable, particularly when the reactants are at least partly in the liquid phase. This mixing is accomplished in a quench box placed between the catalyst beds.

The present invention is concerned with an improved design for the quench box.

According to the present invention, a quench box suitable for use in a downflow reactor has walls defining an inner and an outer compartment, the wall between the inner and outer compartments having passages, a contoured roof higher at the edges and the middle to form a valley between, the valley having passages admitting to the inner compartment, and a floor having passages in the section defining the outer compartment.

All the other portions of the wall, roof, and floor are solid. Flow of reactants is thus through the passages in the valley into the inner compartment, through the passages in the inner wall into the outer compartment and then through the passages in the floor of the outer compartment.

As indicated above, these quench boxes are placed between catalyst beds. A hydrogen injection system may be placed above the quench boxes, preferably a system directing the hydrogen down into the valley at an angle to the vertical.

Preferably the total area of the passages in the valley is less than the area of the passages between the inner and outer compartments. As the reactants and hydrogen pass through the valley passages their rate of flow is therefore, increased, creating a venturi effect and ensuring good mixing. The ratio of the inter-compartment passage area to the valley passage area may be from 1.5 : 1 to 2.5 : 1. Preferably a relatively large number of passages are used for the valley passages to sub-divide the stream of reactants and hydrogen and further assist in the mixing. Thus each passage may be from 0.5 to 1.0 percent of the total passage area.

The size of the individual passages between the inner and outer compartments is less critical and each passage may be from 2 to 3 percent the total passage area.

The area of the passages through the floor of the outer compartment is preferably greater than the area of the intercompartment passages, suitable ratios being from 2 : 1 to 3 : 1.

A single quench box will normally be used in each space between catalyst beds where hydrogen is injected, the box extending across the area of the reactor. Since the reactors are normally pressure vessels they will normally be circular in crosssection and the quench boxes will thus be cylindrical giving an annular valley in the roof, a cylindrical inner compartment and an annular outer compartment. The inner compartment may, however, be rectangular if desired. The hydrogen injection device is preferably a ring of larger diameter than the inner compartment with holes directing the hydrogen downwardly and inwardly towards the passages in the roof.

Other dimensions and ratios of the quench box will depend on the particular situation in which it is to be used, particularly on the overall reactant flow rate. For normal uses, the volume of the outer compartment will be greater than that of the inner compartment and suitable ratios may be from 15 : 1 to 20 : 1. The box can be relatively shallow in relation to its width suitable width: height ratios being from 15 : 1 to 20 : 1. The slopes of the valley sides may be relatively small, being for example at an angle of from 1° to 4° to the horizontal. The high points at the centre and sides of the roof are preferably at the same height. Since the bottom of the valley is above the inner compartment which preferably has a smaller volume than the outer compartment it follows that the slopes are not necessarily equal.

The present invention includes a downflow reactor having at least one quench box as previously described. The reactor may be a multi bed reactor with a series of catalyst beds one above the other.

The quench box may be supported in the reactor in any convenient manner. It may also have associated with it and below it a perforated distribution tray so that the reactants and hydrogen are distributed evenly across the whole of the next catalyst bed. The passages in the tray may have chimneys and cowls above them to regulate the liquid level on the tray and control the passage of the reactants through the tray. The cowls may conveniently be double-entry cowls with separate entrances for liquid and gas as described in U.K. Pat. No. 1,113,751. In this prior patent the cowls are associated with baskets extending into the catalyst bed, but such baskets may not be required with the trays associated with the present quench box. The distribution tray above the first bed of the reactor may however have associated baskets and be designed as described in U.K. Pat. No. 1,113,751. It will not, however, normally be necessary to have a quench box above the first bed.

The quench box and distribution tray may have a small number (e.g., 2) of relatively large diameter holes (e.g. 0.5 percent of the reactor cross section) through them and sealed from them to allow catalyst loading and unloading without removing the boxes and trays from the reactor.

The present invention is, as indicated earlier, suitable for use with hydrocatalytic processes in which at least part of the reactants are in the liquid phase. It is thus particularly suitable for the hydrocatalytic treatment of petroleum fractions boiling above 300°C. Suitable feedstocks are thus wax distillate fractions boiling within the range 300° – 550°C, atmospheric residues boiling above 300°C, and vacuum residues boiling above 550°C. Such feedstocks are normally hydrotreated for the purpose of desulphurisation or hydrocracking under the following ranges of conditions.

|  | | Broad range | Preferred range | |
| --- | --- | --- | --- | --- |
|  | | | for Desulphurisation | for Hydrocracking |
| Temperature | °C | 300 – 450 | 320 – 430 | 350 – 450 |
| Pressure | bars gauge | 35 – 210 | 35 – 170 | 70 – 210 |
| Space velocity | v/v/hr | 0.2 – 5 | 0.5 – 3.0 | 0.5 – 3.0 |
| Hydrogen treating rate | m³/m³ | 300 – 3600 | 360 – 1800 | 720 – 3600 |

The space velocities and hydrogen treating rates above are the overall treating rates. The proportion of hydrogen added initially and that used as quench will vary depending on the exothermicity of the reaction, which in its turn will depend in part on the nature of the feedstock. In general, however, the amount of hydrogen used as quench may vary from 10 – 60 percent of the total hydrogen.

Figure 2:
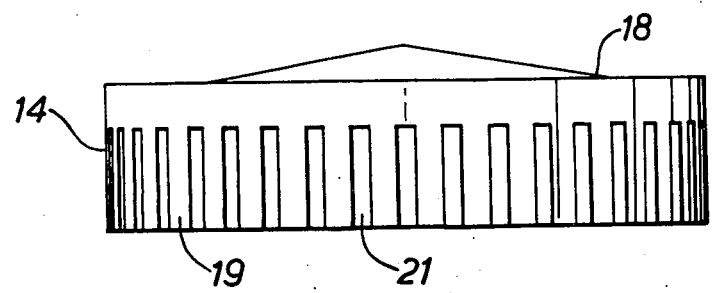
Figure 3:
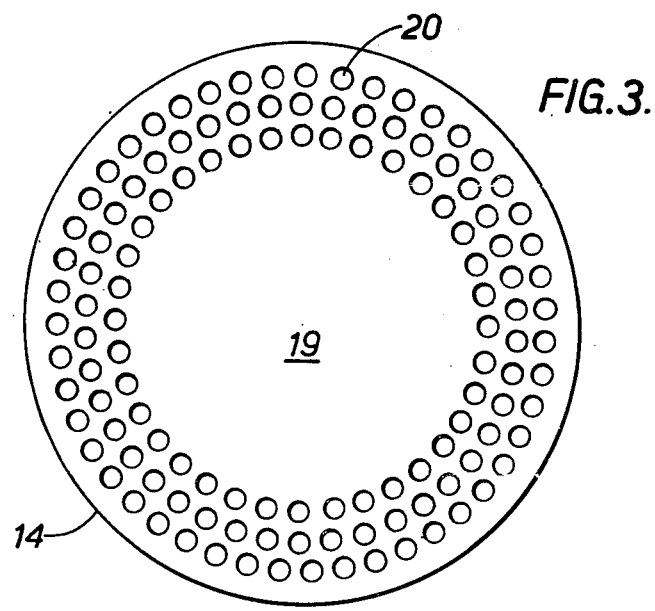
Figure 4:
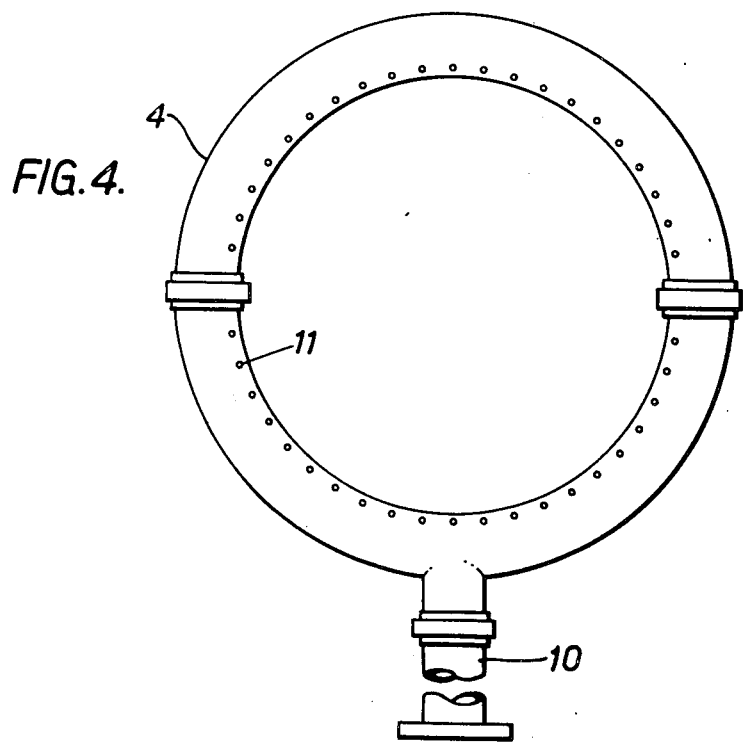

The invention is illustrated with reference to the accompanying drawings in which:

FIG. 1 is a cross-section of part of a cylindrical reactor containing a quench box according to the present invention, FIGS. 2 and 3 are a plan and elevation of an inner compartment of the quench box, and FIG. 4 is a plan of a hydrogen injection ring seen from below.

In FIG. 1 the main components are the reactor wall 2, catalyst bed support 3, hydrogen injection ring 4, quench box 5, and distribution tray 6.

The catalyst bed support is made up of parallel inverted-T beams 7 fixed to the reactor wall. A catalyst support grid 8 of known type is laid across the beams and on that is a layer of ceramic balls 9 and then the catalyst bed itself (not shown).

The hydrogen injection ring 4 shown in more detail in FIG. 4 has a pipe 10 passing through a gas-tight flange in the reactor wall. The ring has holes 11 in its inner lower side directing hydrogen downwardly and inwardly at an angle of 30° to the horizontal.

The quench box 5 has a roof 12, side wall 13, inner wall 14 and floor 15. It is supported by beams (not shown) and by brackets 17 on the reactor wall 2. The roof is contoured to form a valley the lowest point 18 of which is above the inner compartment 19 formed by inner wall 14. FIGS. 2 and 3 show in more detail the inner compartment 19. Holes 20 in the floor of the valley 18 are in three concentric rings and rectangular passages 21 in the inner wall 14 are spaced evenly all around it.

The floor 15 of the quench box has passages (not shown) in it from the outer compartment 28 formed by inner wall 14 and outer wall 13.

For ease of assembly and placement in the reactor, the outer compartment 28 may be formed of a number of separate segments but, if so, the radial walls should have holes allowing free flow of reactants throughout the outer compartment.

Distribution tray 6 is supported by brackets 22 on the wall 2 of the reactor. The tray has chimneys 23 over its surface, each chimney being surmounted by a cowl 24 having two entrances 25 and 26.

A layer of ceramic balls 27 is placed on top of the next catalyst bed (not shown).

Pipes 29 extend from one catalyst bed to the next, through the quench box and distribution tray but sealed from them.

In a specific embodiment quench boxes 5 were used in a five catalyst bed vertical reactor operating under down flow. A distribution tray similar to 6 but with baskets below the chimneys extending downwardly into the first catalyst bed was used at the top of the reactor, systems as shown in the drawings were placed between the first and second, the second and third, and the third and fourth catalyst beds, and a distribution tray 6 was placed between the fourth and fifth beds. The reactor was used for the desulphurisation of an atmospheric residue from Kuwait crude oil having an initial boiling point of 350°C and a specific gravity 0.967 within the ranges of process conditions previously described.

The reactant flow through the quench box was thus vertically through the holes 20 in the roof of the quench box together with additional hydrogen injected tangentially into the roof, then horizontally through the passages 21 to the outer compartment and then vertically through the passages in the floor of the outer compartment.

Pipes 29 did allow a small proportion of the reactants to by-pass the quench box 5 and distribution tray 6, but were included to allow all the catalyst beds to be discharged from the base of the reactor.

I claim:

1. A quench box suitable for use in a down-flow reactor having walls defining an inner and an outer compartment, the wall between the inner and outer compartments having passages, a contoured roof higher at the edges and the middle to form a valley between, the valley having passages admitting to the inner compartment, and a floor having passages in the section defining the outer compartment.

2. A quench box as claimed in claim 1 wherein the ratio of the intercompartment passage area to the valley passage area is from 1.5:1 to 2.5:1.

3. A quench box as claimed in claim 1 wherein the area of each valley passage is from 0.5 to 1.0 percent of the total valley passage area.

4. A quench box as claimed in claim 1 wherein the ratio of the area of the passages through the floor of the outer compartment to the area of the intercompartment passages is from 2:1 to 3:1.

5. A quench box as claimed in claim 1 wherein the ratio of the volume of the outer compartment to the volume of the inner compartment is from 15:1 to 20:1.

6. A quench box as claimed in claim 1 wherein the ratio of width to height is from 15:1 to 20:1.

7. A quench box as claimed in claim 1 wherein the slope of the valley sides is from 1° to 4° to the horizontal.

* * * * *